United States Patent [19]
Wallquist et al.

[11] Patent Number: 5,738,719
[45] Date of Patent: Apr. 14, 1998

[54] PIGMENT COMPOSITIONS OF DIKETOPYRROLOPYRROLES

[75] Inventors: Olof Wallquist, Marly; Ingo Schlöder, Matran; Gary Wooden, Oberschrot, all of Switzerland

[73] Assignee: Ciba Specialty Chemicals Corporation, Tarrytown, N.Y.

[21] Appl. No.: 799,969

[22] Filed: Feb. 14, 1997

Related U.S. Application Data

[63] Continuation of Ser. No. 660,440, Jun. 7, 1996, abandoned.

[30] Foreign Application Priority Data

Jun. 15, 1995 [CH] Switzerland .................... 1771/95
Mar. 14, 1996 [CH] Switzerland ..................... 677/96

[51] Int. Cl.$^6$ ....................................... C08K 5/00
[52] U.S. Cl. .................. 106/498; 106/493; 106/494; 524/104; 524/105; 548/453
[58] Field of Search ....................... 106/493, 494, 106/498; 524/104, 105; 548/453

[56] References Cited

U.S. PATENT DOCUMENTS 4,579,949  4/1986  Rochat et al. ................. 546/167
4,720,305  1/1988  Iqbal et al. .................... 106/494
4,783,540  11/1988  Bäbler .......................... 548/453

Primary Examiner—Mark L. Bell
Assistant Examiner—Scott L. Hertzog
Attorney, Agent, or Firm—Kevin T. Mansfield

[57] ABSTRACT

A pigment composition, comprising
a) 80–99.8 mol % of a diketopyrrolopyrrole of formula

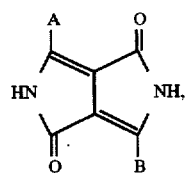

(I)

wherein A and B are each independently of the other a

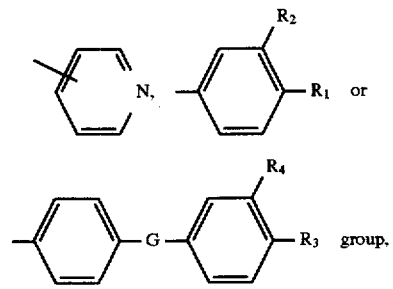

wherein $R_1$ and $R_2$ are each independently of the other hydrogen, chloro, bromo, $C_1$–$C_6$alkyl, $C_1$–$C_8$alkoxy, $C_2$–$C_{19}$alkoxycarbonyl, $C_2$–$C_{19}$alkylcarbamoyl, $C_1$–$C_{18}$alkylmercapto, $C_1$–$C_{18}$ alkylamino, $C_5$–$C_6$cycloalkyl, G is a direct bond or —O—, —S—, —SO—, —SO$_2$— or —NR$_5$—, $R_3$ and $R_4$ are each independently of the other hydrogen, chloro, bromo, $C_1$–$C_6$alkyl, $C_1$–$C_{18}$alkoxy or $C_1$–$C_{18}$alkylamino, and $R_5$ is hydrogen or $C_1$–$C_6$alkyl, and b) 20–0.2 mol % of a diketopyrrolopyrrole of formula

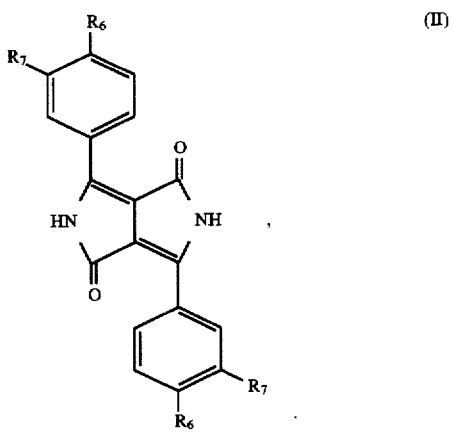

(II)

wherein one of $R_6$ or $R_7$ is hydrogen and the other is —CN. Such pigment compositions are distinguished by excellent resistance to recrystallisation and heat.

7 Claims, No Drawings

PIGMENT COMPOSITIONS OF DIKETOPYRROLOPYRROLES

This is a continuation of application Ser. No. 08/660,440 filed Jun. 7, 1996, now abandonded.

The present invention relate to crystal growth-inhibited pigment compositions comprising two diketopyrrolopyrroles, wherein the one is substituted by cyano groups, as well as to the preparation and the use of said pigment compositions.

U.S. Pat. No. 4,720,305 discloses a mixed synthesis for the preparation of diketopyrrolopyrrole mixtures which are, inter alia, distinguished by high colour strength and transparency. Examples are mentioned, inter alia, wherein one of the starting nitriles is isophthalonitrile. According to this mixed synthesis, mixtures of 3 different diketopyrrolopyrroles are always inevitably obtained and, if one of the nitriles is isophthalonitrile, 3 diketopyrrolopyrroles of formulae

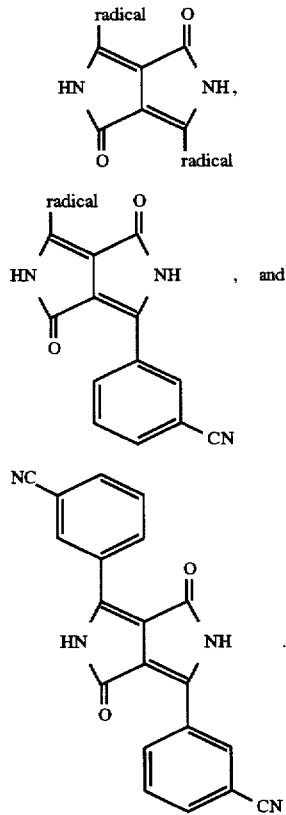

It has now been found that when a minor amount of a cyano-substituted diketopyrrolopyrrole is added before or during the synthesis of a pyrrolopyrrole which is not substituted by cyano, the crystal growth inhibition is very surprisingly enhanced. Accordingly it is possible to produce, depending on the conditions of protolysis, highly transparent as well as opaque pigment forms of superior colour strength which are particularly resistant to recrystallisation and heat and which are also very suitable for the warp-free pigmenting of polyolefins.

Accordingly, this invention relates to a pigment composition comprising a) 80–99.8 mol % of a diketopyrrolopyrrole of formula I

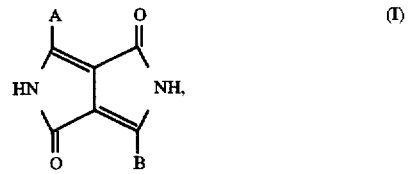

wherein A and B are each independently of the other a

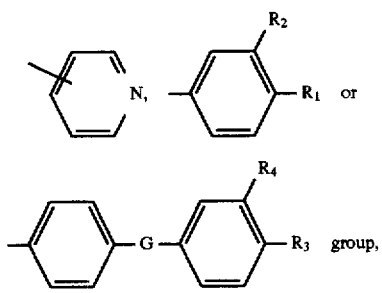

wherein $R_1$ and $R_2$ are each independently of the other hydrogen, chloro, bromo, $C_1$–$C_6$alkyl, $C_1$–$C_{18}$alkoxy, $C_2$–$C_{19}$alkoxycarbonyl, $C_2$–$C_{19}$akylcarbamoyl, $C_1$–$C_{18}$alkylmercapto, $C_1$–$C_{18}$alkylamino, $C_5$–$C_6$cycloalkyl, G is a direct bond or —O—, —S—, —SO—, —SO$_2$— or —NR$_5$—, $R_3$ and $R_4$ are each independently of the other hydrogen, chloro, bromo, $C_1$–$C_6$alkyl, $C_1$–$C_{18}$alkoxy or $C_1$–$C_{18}$alkylamino, and $R_5$ is hydrogen or $C_1$–$C_6$alkyl, and b) 20–0.2 mol % of a diketopyrrolopyrrole of formula

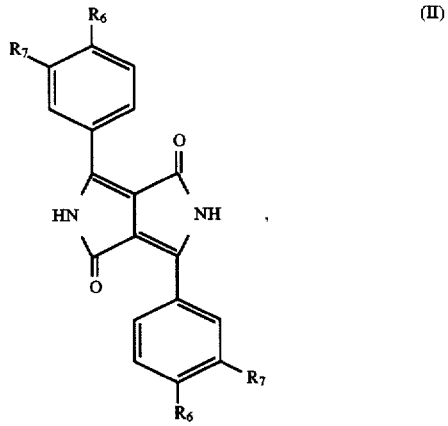

wherein one of $R_6$ or $R_7$ is hydrogen and the other is —CN.

$C_1$–$C_6$Alkyl is typically methyl, ethyl, n-propyl, isopropyl, n-butyl, sec-butyl, tert-butyl, amyl, hexyl and, in the case of $C_1$–$C_{18}$alkyl, additionally e.g. heptyl, octyl, 2-ethylhexyl, nonyl, decyl, dodecyl, tetradecyl, hexadecyl or octadecyl. Alkyl in $C_2$–$C_{19}$alcylcarbamoyl, $C_1$–$C_{18}$alkylmercapto and $C_1$–$C_{18}$alkylamino can likewise have the same meaning.

$C_1$–$C_{18}$Alkoxy substituents are typically methoxy, ethoxy, n-propoxy, isopropoxy, n-butoxy, tert-butoxy, amyloxy, hexyloxy, decyloxy, dodecyloxy, hexadecyloxy or octadecyloxy. Alkoxy in $C_2$–$C_{19}$alkoxycarbonyl can likewise have the same meaning.

$C_5$–$C_6$Cycloalkyl is typically cyclopentyl and, preferably, cyclohexyl.

Particularly interesting pigment compositions are those comprising 90–99.7 mol % of the diketopyrrolopyrrole of formula I and 10–0.3 mol % of the diketopyrrolopyrrole of formula II.

Preferred novel pigment compositions are those comprising a diketopyrrolopyrrole of formula I, wherein A and B are each independently of the other a

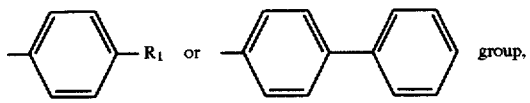

group, wherein $R_1$ is hydrogen, chloro, bromo, methyl, tert-butyl, tert-amyloxycarbonyl or tert-butyloxycarbonyl and, in particular, those wherein A and B are identical, and a diketopyrrolopyrrole of formula II, wherein $R_6$ is hydrogen and $R_7$ is —CN.

As mentioned above, the pigment compositions of this invention are obtained by the addition of the required amount of a cyano-substituted diketopyrrolopyrrole before or during the synthesis of the diketopyrrolopyrrole of formula I. This process is novel and therefore constitutes a further object of this invention, i.e. a process for the preparation of the above-defined novel pigment compositions, comprising a) 80–99.8 mol % of a diketopyrrolopyrrole of formula I and b) 20–0.2 mol % of a diketopyrrolopyrrole of formula II by reacting 1 mol of a dialkyl succinate or diphenyl succinate, in which succinate radical alkyl is $C_1$–$C_{18}$alkyl, and phenyl is phenyl which is unsubstituted or substituted by one or two halogen atoms, one or two $C_1$–$C_6$alkyl groups or $C_1$–$C_6$alkoxy groups, with one mole each of a nitrile of formulae A—CN and B—CN, wherein A and B have the meaning cited above, in an inert organic solvent in the presence of an alkali metal or an alkali metal alcoholate as strong base at elevated temperature to a pigment alkali metal salt with subsequent release of the diketopyrrolopyrrole of formula I by protolysis of the corresponding pigment alkali metal salt with subsequent conditioning according to commonly known methods, which process comprises adding before or during this synthesis 0.2–20 mol % of a diketopyrrolopyrrole of formula

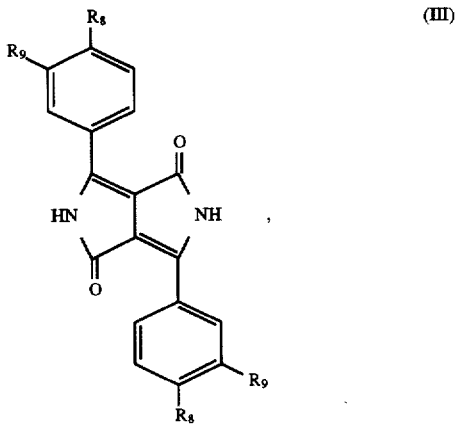

(III)

wherein one of $R_8$ or $R_9$ is hydrogen and the other is —CN.

$R_6$ and $R_8$ are preferably hydrogen and $R_7$ and $R_9$ are —CN.

$C_1$–$C_{18}$Alkyl in the succinate radical is typically methyl, ethyl, n-propyl, isopropyl, n-butyl, tert-butyl, amyl, hexyl, octyl, 2,2-dimethylhexyl, decyl, dodecyl, hexadecyl or octadecyl.

$C_1$–$C_6$Alkyl and $C_1$–$C_6$alkoxy phenyl substituents in the succinate radical have the same meaning as cited above for $R_1$ and $R_2$.

The addition of the diketopyrrolopyrrole of formula III is conveniently carried out prior to the protolysis of the pigment alkali metal salt or, preferably, at the beginning of the synthesis, before succinates and nitriles are added to the given solvent and the base. It is preferred to add 0.3–10 mol % of the diketopyrrolopyrrole of formula III.

The mol % amounts cited for the compounds of formulae I, II and III relate to the compounds I, II and III at a theoretical 100% yield of the composition, calculated on the basis of the amount of nitrile used and the compound of formula III.

Diketopyrrolopyrroles of formula III are known substances and can be prepared, for example, according to the process cited above for the preparation of diketopyrrolopyrroles of formula I and disclosed, inter alia, in U.S. Pat. No. 4,579,949.

Accordingly, either highly transparent or opaque pigment forms can be prepared in simple manner depending on the temperature of protolysis and conditioning. At elevated temperatures, highly transparent pigment forms can also be obtained without the addition of acids.

The addition of the crystal growth inhibitor (III) facilitates the reproducibility of the process for the preparation of said pigment compositions substantially.

The invention also relates to a process for the preparation of the novel pigment composition by acid or, preferably, alkaline precipitation of a mixture of the diketopyrrolopyrrole of formula I and the diketopyrrolopyrrole of formula III in a molar ratio of 80–99.8:20–0.2 according to commonly known methods (see, inter alia, U.S. Pat. No. 4,783,540).

As mentioned hereinbefore, the pigment compositions of this invention are also very suitable for the warp-free pigmenting of polyolefins. Accordingly, the invention also relates to a process for the warp-free pigmenting of polyolefins using a pigment composition of this invention.

The novel pigment compositions can also be used for colouring organic material of high molecular weight.

Illustrative examples of high molecular weight organic materials which can be coloured or pigmented with the novel pigment compositions are cellulose ethers and esters, typically ethyl cellulose, nitro cellulose, cellulose acetate, cellulose butyrate, natural resins or synthetic resins, typically polymerisation or condensation resins, such as aminoplasts, preferably urea/formaldehyde and melamine/formaldehyde resins, alkyd resins, phenolic plastics, polycarbonates, polyolefins, polystyrene, polyvinyl chloride, polyamides, polyurethanes, polyester, ABS, polyphenylene oxides, rubber, casein, silicone and silicone resins, singly or in mixtures.

The above high molecular weight organic compounds may be obtained singly or as mixtures as plastics, melts or in the form of spinning solutions, paints, coating materials or printing inks. Depending on the end use requirement, it is expedient to use the pigment compositions of this invention as toners or in the form of preparations.

The pigment compositions of this invention can be used in an amount of 0.01 to 30% by weight, preferably of 0.1 to 10% by weight, based on the high molecular weight organic material to be pigmented.

Depending on the conditioning process or purpose of application, it can be advantageous to add specific amounts of texture-improvers to the pigment either before or after the conditioning process, provided that this does not have any negative effect on the use of the novel pigment compositions (in particular in polyethylene). Suitable texture-improvers are preferably fatty acids containing at least 18 carbon atoms, typically stearic or behenic acid or the amides or metal salts thereof, preferably magnesium salts, as well as plasticisers, waxes, colophonic acids, typically abietic acid, colophonium soap, alkylphenols or aliphatic alcohols, typically stearic alcohol or aliphatic 1,2-dihydroxy compounds containing 8 to 22 carbon atoms, typically 1,2-dodecanediol, and also modified colophonium maleinate resins or fumaric acid colophonium resins. The texture-improvers are preferably added in amounts of 1.0–50% by weight, more preferably of 5–40% by weight, based on the end product. The above-mentioned 1,2-dihydroxy compounds, in particular 1,2-dodecanediol, also serve to improve the filtration of the suspended pigment compositions.

The pigmenting of the high molecular weight organic materials with the pigment compositions of this invention is conveniently effected by incorporating them by themselves or in the form of masterbatches in the substrates using roll mills, mixing or milling apparatus. The pigmented material is then brought into the desired final form by methods which are known per se, conveniently by calendering, moulding, extruding, coating, casting or by injection moulding. It is often deskable to incorporate plasticisers into the high molecular weight compounds before processing in order to produce non-brittle mouldings or to diminish their brittleness. Suitable plasticisers are typically esters of phosphoric acid, phthalic acid or sebacic acid. The plasticisers may be incorporated into the novel pigment compositions before or after working the pigments into the polymers. To obtain different shades, it is also possible to add to the high molecular weight organic materials fillers or other chromophoric components such as white, coloured or black pigments in any amount, in addition to the novel pigment compositions.

For pigmenting paints, coating materials and printing inks, the high molecular weight organic materials and the pigment compositions of this invention, together with optional additives such as fillers, other pigments, siccatives or plasticisers, are finely dispersed or dissolved in a common organic solvent or solvent mixture. The procedure may be such that the individual components by themselves, or also several jointly, are dispersed or dissolved in the solvent and thereafter all the components are mixed.

The novel pigment compositions are particularly suitable for colouring plastics, more particularly polyvinyl chloride and polyolefins, and paints, preferably automotive and industrial paints.

When used for colouring e.g. pains or polyolefins, the novel pigment compositions have good allround pigment properties, such as good dispersibility, superior colour strength and purity, good fastness to migration, light and weathering, good glossing and rheological properties as well as, in fine particles, excellent transparency.

In the processing of plastics, in particular of polyolefins and industrial paints, which are processed at elevated temperatures, the novel pigment compositions are distinguished by high stability to heat and processing. The improved reproducibility furthermore facilitates the colouristic reproducibility of the pigment compositions of this invention.

The invention is illustrated by the following Examples.

EXAMPLE 1

A sulfonating flask is charged, under nitrogen, with 170 ml of tert-amyl alcohol. After the addition of 11.04 g of sodium, the mixture is heated to 92°–102° C. With vigorous stirring, the fused sodium is kept at 100°–107° C. overnight. To the resulting solution are then added at 100° C. 2.3 g (0.0068 mol, i.e. 4.0 mol % based on the end product (pigment composition) at a 100% yield) of the compound of formula

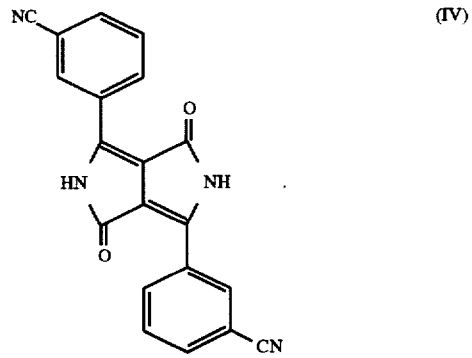

Subsequently, 44.02 g (0.32 mol) of 4-chlorobenzonitrile and 37.2 g of diisopropyl succinate, dissolved in 50 ml of tert-amyl alcohol, are added over 2 hours at 80°–98° C. The reaction mixture is stirred for a further 3 hours at 80° C. and an additional 4.88 g of diisopropyl succinate are added concomitantly. The reaction mixture is then cooled to room temperature and poured into a mixture of 270 ml of methanol, 200 ml of water and 48.1 g of conc. sulfuric acid at 20° C. and then stirred for 6 hours at 20° C. The red mixture is filtered and the filter product is washed with methanol and water. The pigment is dried at 80° C. in vacuum drying oven, affording 46.5 g of a red powder.

| Analysis: | C | H | N | Cl |
|---|---|---|---|---|
| calcd.: | 61.03% | 2.83% | 8.26% | 18.90% |
| found: | 60.67% | 3.05% | 8.33% | 18.54% |

EXAMPLE 2

12.0 g of sodium are added to 130 ml of anhydrous tert-amyl alcohol and the mixture is heated to 100° C. and stirred until the sodium has completely reacted. After cooling the solution to 100° C., 0.44 g (1.31 mmol, 1 mol %) of the diketopyrrolopyrrole of formula IV is added first, then 31.3 g (261.6 mmol) of p-toluinitrile are added, and subsequently 34.5 g of diisopropyl succinate are added slowly (5 hours), with stirring, at 105°–110° C. Stirring is continued for 2 hours after this addition and then the mixture is diluted with 50 ml of tert-amyl alcohol, cooled to room temperature and added to a mixture of 141 ml of water and 141 ml of methanol at a starting temperature of 14° C. The residues are rinsed with 20 ml of tert-amyl alcohol and the mixture is stirred for 4 hours at 68° C., cooled to room temperature and filtered. The residue is washed with methanol and water until the filtrate is colourless and then dried in a vacuum drying oven at 80° C., affording 30.9 g of a product which colours PVC in a red opaque shade.

| Analysis: | C | H | N |
|---|---|---|---|
| calcd.: | 75.9 | 5.1 | 8.9% |
| found: | 75.1 | 5.2 | 8.9% |

EXAMPLE 3

13.8 g of sodium are added to 150 ml of anhydrous a tert-amyl alcohol and the mixture is heated to 100° C. and stirred until the sodium has completely reacted. After cooling the solution to 100° C., 1.57 g (4.6 mmol, 3 mol %) of the diketopyrrolopyrrole of formula IV are added first, then 47.8 g (300 mmol) of 4-tert-butylbenzonitrile, and subsequently 39.7 g of diisopropyl succinate are added slowly (3 hours), with stirring, at 105°–110° C. Stirring is continued for 2 hours after the addition at 103° C. and then the mixture is diluted with 60 ml of tert-amyl alcohol, cooled to room temperature and added to a mixture of 250 ml of water and 250 ml of methanol at a starting temperature of 20° C. The residues are rinsed with 20 ml of tert-amyl alcohol and the mixture is stirred for 4 hours at 90° C. (superpressure=1 bar), cooled to room temperature and filtered. The residue is washed with methano a vacuum drying oven at 80° C., affording 40.0 g of a product which colours PVC in an orange shade.

| Analysis: | C | H | N |
| --- | --- | --- | --- |
| calcd.: | 78.0 | 7.0 | 7.0% |
| found: | 77.7 | 7.2 | 7.0% |

EXAMPLE 4

13.8 g of sodium are added to 150 ml of anhydrous tert-amyl alcohol and the mixture is heated to 100° C. and stirred until the sodium is completely reacted. After cooling the solution to 100° C., 2.4 g (7.1 mmol, 4.5 mol %) of the diketopyrrolopyrrole of formula IV are added first, then 47.8 g (300 mmol) of 4-tert-butylbenzonitrile, and subsequently 39.4 g of diisopropyl succinate are added slowly (5 hours), with stirring, at 105°–110° C. Stirring is continued for 2 hours at 103° C. and then the mixture is diluted with 80 ml of tert-amyl alcohol, cooled to room temperature and added to a mixture of 160 ml water and 160 ml of methanol at a starting temperature of 15° C. After the addition is complete, the mixture is diluted with 150 ml of water/methanol 1:1 (volume) and stirred for 3 hours at 30° C., cooled to room temperature and filtered. The residue is washed with methanol and water until the filtrate is colourless and then dried in a vacuum drying oven at 80° C., affording 40.0 g of a dark red product which colours PVC in an orange transparent shade.

| Analysis: | C | H | N |
| --- | --- | --- | --- |
| calcd.: | 78.0 | 7.0 | 7.0% |
| found: | 76.8 | 7.1 | 7.3% |

EXAMPLE 5

13.8 g of sodium are added to 146 ml of anhydrous tert-amyl alcohol, heated to 100° C. and stirred until the sodium is completely reacted. After cooling the solution to 100° C., 2.3 g (6.7 mmol, 4.3 mol %) of the diketopyrrolopyrrole of formula IV are added first and then a mixture of 31.2 g (99%, 300 mmol) of benzonitrile and 39.5 g of diisopropyl succinate is added over 6 hours. Stirring is continued for 2 hours at 95° C. and then the mixture is diluted with 90 ml of tert-amyl alcohol, cooled to room temperature and added to a mixture of 140 ml of water and 200 ml of methanolate a starting temperature of 22° C. The residues are rinsed with 2×10 ml of tert-amyl alcohol. After the addition is complete, the mixture is stirred for 1 hour at 35° C. and filtered. The residue is washed with methanol and water until the filtrate is colourless and then dried in a vacuum drying oven at 80° C., affording 34.1 g of a red product which colours PVC in a red transparent shade.

| Analysis: | C | H | N |
| --- | --- | --- | --- |
| calcd.: | 75.0 | 4.2 | 9.7% |
| found: | 73.8 | 4.2 | 10.1% |

EXAMPLE 6

A sulfonating flask is charged, under nitrogen, with 210 ml of tert-amyl alcohol. After the addition of 10.60 g of sodium, the mixture is heated to 92°–102° C. With vigorous stirring, the fused sodium is kept at 100°–107° C. overnight. To the resulting solution are then added 42.06 g of 4-biphenylnitrile and 2.20 g of the diketopyrrolopyrrole of formula IV at 95° C. The mixture is again heated to 105°–110° C. and 27.9 g of diisopropyl succinate are added over 6 hours. The reaction mixture is stirred for a further 3 hours at 100° C. and then cooled to room temperature and poured into 600 ml of water. The red suspension is then heated to 85°–90° C. and stirred for 1 hour. To eliminate the tert-amyl alcohol, water vapour is introduced for 1 hour. The red mixture is filtered at 50° C. and the filter product is washed with water and then with methanol and water. The pigment is dried at 80° C. in a vacuum drying oven, affording 43.0 g of a red powder.

| Analysis: | C | H | N |
| --- | --- | --- | --- |
| calcd.: | 81.8% | 4.6% | 6.4% |
| found: | 80.8% | 4.6% | 6.5% |

EXAMPLE 7

A sulfonating flask is charged, under nitrogen, with 330 ml of tert-amyl alcohol. After the addition of 7.20 g of sodium, the mixture is heated to 92°–102° C. With vigorous stirring, the fused sodium is kept at 100°–107° C. overnight. To the resulting solution are then added 45.0 g of the diketopyrrolopyrrole of formula

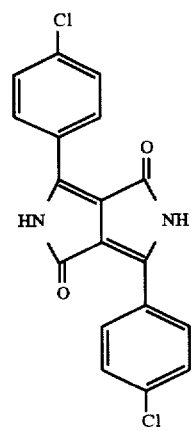

and 2.25 g of the diketopyrrolopyrrole of formula IV at 80° C. The mixture is again heated to 100°–105° C. and stirred for a further 16 hours. The reaction mixture is then cooled to room temperature and forced into a mixture of 240 g of ice, 480 ml of water and 32.3 g of conc. sulfuric acid at 0°

C. and then stirred for 6 hours at 0° C. The red mixture is filtered and the filter product is washed with methanol and water. The pigment is dried at 80° C. in a vacuum drying oven, affording 45.7 g of a red powder.

EXAMPLE 8

7.5 g of the pigment of Example 1, 98.9 g of CAB solution consisting of 41.0 g of cellulose acetobutyrate ®CAB 531.1, 20% in butanol/xylene 2:1 (Eastman Chem.)

1.5 g of zirconium octoate, 18.5 g of ®SOLVESSO 150*(ESSO), 21.5 g of butylacetate, and 17.5 g of xylene, 36.5 g of polyester resin ®DYNAPOL H700 (Dynamit Nobel), 4.6 g of melamine resin MAPRENAL MF650 (Hoechst) and 2.5 g of dispersant ®DISPERBYK 160 (Byk Chemie) are dispersed together for 90 minutes in a disperser (total varnish 150 g; 5% of pigment).

* Aromatic hydrocarbons 27.69 g of the mass-tone varnish so obtained are mixed for the base coat varnish with 17.31 g of Al stock solution (8%) consisting of 12.65 g of ®SILBERLINE SS 3334AR, 60% (Silberline Ltd.)

56.33 g of CAB solution (composition as above)

20.81 g of polyester resin ®DYNAPOL H700

2.60 g of melamine resin ®MAPRENAL MF650

7.59 g of ®SOLVESSO 150 and spray-coated onto an aluminium sheet (wet film c. 20 μm). After allowing this varnish to dry in the air for 30 minutes at room temperature, a TSA varnish consisting of 29.60 g of acryl resin ®URACRON 2263 XB, 50% in xylene/butanol (Chem. Fabrik Schweizerhalle), 5.80 g of melamine resin ®CYMEL 327, 90% in isobutanol, 2.75 g of butyl glycol acetate, 5.70 g of xylene, 1.65 g of n-butanol 0.50 g of silicone oil, 1% in xylene, 3.00 g of light stabiliser ®TINUVIN 900, 10% in xylene (Ciba)

1.00 g of light stabiliser ®TINUVIN 292, 10% in xylene (Ciba)

is spray-coated as top coat varnish (wet film c. 50 μm). The varnish is allowed to dry in the air for a further 30 minutes at room temperature and is then stoved for 30 minutes at 130° C., giving a red transparent varnish having excellent stabilities.

EXAMPLE 9

0.6 g of the pigment of Example 1 is mixed with 67 g of polyvinyl chloride, 33 g of dioctyl phthalate, 2 g of dibutyl tin dilaurate and 2 g of titanium dioxide and processed for 15 minutes at 160° C. on a roll mill to a thin sheet. The red transparent PVC sheet so obtained has superior colour strength and has good stability to migration and light.

EXAMPLE 10

1000 g of polypropylene granulate (®DAPLEN PT-55, Chemie LINZ) and 20 g of a 50% pigment preparation, consisting of 10 g of the pigment of Example 1 and 10 g of magnesium behenate, are intimately mixed in a mixer drum. The granulate so treated is spun at 260° to 285° C. according to the melt spinning process, giving red strongly coloured filaments having excellent light and textile fastness properties.

EXAMPLE 11

A mixture of 1.0 g of the pigment obtained in Example 2, 1.0 g of anti-oxidant (IRGANOX®1010, CIBA-GEIGY AG) and 1000 g of polyethylene-HD granulate (®VESTOLEN 60-16, HUELS) is premixed for 15 minutes in a glass flask on a roller gear table. The mixture is then extruded in two passes in a single-screw extruder and the granulate so obtained is moulded to plates in an injection moulding machine (Allround Aarburg 200) at 220° C. and then post-formed for 5 minutes at 180° C. The pressed plates are of a red shade having good colour strength and good stabilities.

EXAMPLE 12

2 g of the pigment obtained in Example 1 are dry-mixed with 1000 g of polyethylene (®STAMILAN 9089 U, DMS Netherlands) for 10 minutes in an eccentric tumble mixer. The mixture is then extruded once in a single-screw extruder at 200° C. The granulate so obtained is processed in an injection moulding machine at 240° C. to plates of 174× 49×2.5 mm dimension. The plates are tempered for 30 minutes in a water bath at 90° C. and then dried in the air. At the earliest after 15 hours, the dimensions of such a plate as well as those of a plate prepared under identical conditions but without pigment are measured (length, width) and warping ΔL (length) and ΔB (width) are determined in ‰ according to the following equations:

$$\Delta L = \frac{L \text{ non-pigmented sample} - L \text{ pigmented sample}}{L \text{ non-pigmented sample}} \times 1000$$

$$\Delta B = \frac{B \text{ non-pigmented sample} - B \text{ pigmented sample}}{B \text{ non-pigmented sample}} \times 1000$$

In practice, those pigments have been found to be warp-free that have absolute values of ΔL and ΔB which are less than 6. Values of less than 3 are preferred.

What is claimed is:

1. A process for the preparation of a pigment composition comprising a) 90–99.7 mol % of a diketopyrrolopyrrole of formula

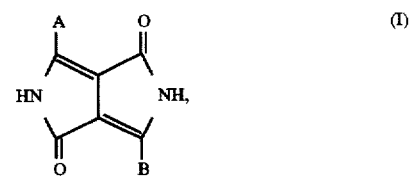

wherein A and B are each independently of the other a

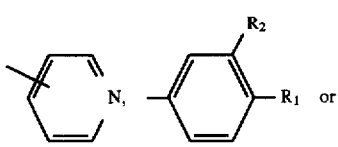

-continued

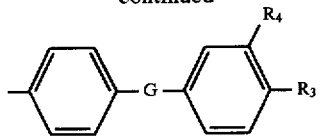

wherein $R_1$ and $R_2$ are each independently of the other hydrogen, chloro, bromo, $C_1$–$C_6$ alkyl, $C_1$–$C_{18}$ alkoxy, $C_2$–$C_{19}$ alkoxycarbonyl, $C_2$–$C_{19}$ alkylcarbamoyl, $C_1$–$C_{18}$ alkylmercapto, $C_1$–$C_{18}$ alkylamino, $C_5$–$C_6$ cycloalkyl, G is a direct bond or —O—, —S—, —SO, —SO$_2$ or —NR$_5$—, $R_3$ and $R_4$ are each independently of the other hydrogen, chloro, bromo, $C_1$–$C_6$ alkyl, $C_1$–$C_{18}$ alkoxy or C–$C_{18}$ alkylamino, and $R_5$ is hydrogen or $C_1$–$C_6$ alkyl, and b) 10–0.3 mol % of a diketopyrrolopyrrole of formula

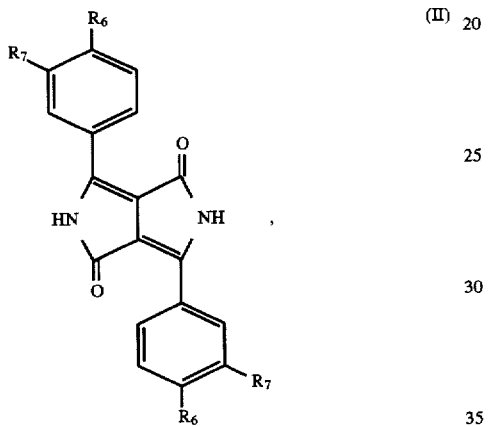

(II)

wherein one of $R_6$ or $R_7$ is hydrogen and the other is —CN;

the process which comprises reacting 1 mol of a dialkyl succinate or diphenyl succinate, in which succinate radical alkyl is C–$C_{18}$alkyl, and phenyl is phenyl which is unsubstituted or substituted by one or two halogen atoms, one or two $C_1$–$C_6$ alkyl groups or $C_1$–$C_6$ alkoxy groups, with one mole each of a nitrile of formulae A—CN and B—CN, wherein A and B have the meaning cited above, in an inert organic solvent in the presence of an alkali metal or an alkali metal alcoholate as strong base at elevated temperature to a pigment alkali metal salt with subsequent release of the diketopyrrolopyrrole of formula I by protolysis of the corresponding pigment alkali metal salt with subsequent conditioning, which process comprises adding before or during this synthesis 0.3–10 mol % of a diketopyrrolopyrrole of formula

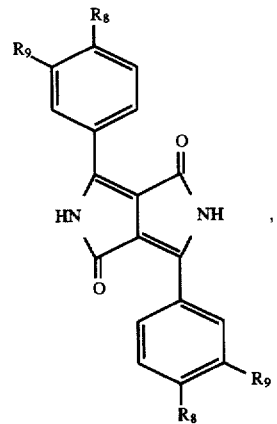

(III)

wherein one of $R_8$ or $R_9$ is hydrogen and the other is —CN.

2. A process according to claim 1 wherein A and B in formula I are identical.

3. A process according to claim 1, wherein the addition of the diketopyrrolopyrrole of formula III is carried out prior to the protolysis of the pigment alkali metal salt.

4. A process according to claim 1, wherein the addition of the diketopyrrolopyrrole of formula III is carried out at the beginning of the synthesis, before succinates and nitriles are added to the given solvent and the base.

5. A process according to claim 1, wherein in formulae II and III $R_6$ and $R_8$ are hydrogen, and $R_7$ and $R_9$ are —CN.

6. A process for the warp-free pigmenting of polyolefins which comprises contacting at least one polyolefin with an effective pigmenting amount of the pigment composition prepared as claimed in claim 1.

7. A high molecular weight organic material pigmented with a pigment composition prepared as claimed in claim 1.

* * * * *